United States Patent [19]

Haruta et al.

[11] Patent Number: 4,873,178

[45] Date of Patent: Oct. 10, 1989

[54] OPTICAL RECORDING MEDIUM AND METHOD FOR CONDUCTING RECORDING ON SAID MEDIUM

[75] Inventors: Masahiro Haruta; Yoko Kuwae, both of Tokyo; Hirohide Munakata; Satoshi Yuasa, both of Yokohama; Etsuko Sugawa, Machida, all of Japan

[73] Assignee: Canon Kabushiki Kaisha, Tokyo, Japan

[21] Appl. No.: 147,577

[22] Filed: Jan. 19, 1988

Related U.S. Application Data

[63] Continuation of Ser. No. 807,954, Dec. 12, 1985, abandoned.

[30] Foreign Application Priority Data

Dec. 18, 1984 [JP] Japan .................................. 59-265457
Dec. 18, 1984 [JP] Japan .................................. 59-265459

[51] Int. Cl.$^4$ ...................... G03C 11/00; G01D 15/10
[52] U.S. Cl. ...................... 430/327; 430/292; 430/270; 430/271; 430/945; 430/275; 430/944; 204/37.6; 204/22; 204/27; 346/76 L; 346/135.1
[58] Field of Search : ...................... 204/37.6, 22, 27; 430/292, 327, 270, 271, 945, 275, 944; 346/76 L, 135.1

[56] References Cited

U.S. PATENT DOCUMENTS

| | | | |
|---|---|---|---|
| 3,073,699 | 1/1963 | Firestine | 430/292 X |
| 3,600,173 | 8/1971 | Levinos | 430/52 |
| 4,360,583 | 11/1982 | Engler et al. | 430/945 X |
| 4,522,691 | 6/1985 | Suginoya et al. | 204/37.6 |
| 4,559,112 | 12/1985 | Tamamura et al. | 204/27 X |
| 4,581,317 | 4/1986 | Simmons, III | 430/945 X |
| 4,582,575 | 4/1986 | Warren et al. | 204/22 X |
| 4,605,607 | 8/1986 | Nikles et al. | 430/945 X |
| 4,735,879 | 4/1988 | Hotta et al. | 430/945 X |

FOREIGN PATENT DOCUMENTS

| | | | |
|---|---|---|---|
| 2414213 | 9/1979 | France | 430/292 |
| 59-193555 | 2/1984 | Japan . | |
| 0073543 | 4/1985 | Japan | 430/270 |

OTHER PUBLICATIONS

Applied Physics (Oyo Butsuri), vol. 52, No. 11 (1983) pp. 971-974.

Primary Examiner—John L. Goodrow
Assistant Examiner—Cynthia Hamilton
Attorney, Agent, or Firm—Fitzpatrick, Cella, Harper & Scinto

[57] ABSTRACT

An optical recording medium is provided which comprises a substrate and a colored film formed by electrolytic polymerization on the substrate. The film may be formed on an electroconductive substrate, or it may be transferred onto a non-electroconductive substrates. A method for recording employing the electrolytically polymerized film is also provided.

8 Claims, 1 Drawing Sheet

OPTICAL RECORDING MEDIUM AND METHOD FOR CONDUCTING RECORDING ON SAID MEDIUM

This application is a continuation of application Ser. No. 807,954, filed Dec. 12, 1985 now abandoned.

BACKGROUND OF THE INVENTION

1. Field of the Invention

This invention relates to an optical recording medium as well as to a method for conducting recording on said medium. More particularly, the present invention relates to an optical recording medium using, as its recording layer, a colored film formed by electrolytic polymerization to enable high density recording, as well as to a method for conducting recording on said medium.

2. Description of the Prior Art

For a recording medium called "optical disk" and capable of recording or memorizing a variety of information at a high density using a light such as a laser beam or the like, various types have hitherto been proposed. From the standpoints of low cost, high density recording, easy production, etc., many studies have been made on such recording media employing an organic material for its recording layer. Various recording media have been employed which comprises an organic material for the recording layer. The examples are the ones comprising a recording layer made of thermally softening or melting material provided over a colored layer for absorbing light to convert it to heat which are supported by a substrate such as glass, or the ones employing colored thermally melting material as a recording layer. In these recording media, the colored layer absorbs a laser beam (a recording light) and converts it to heat; the heat melts the colored layer or the recording layer formed thereon to cause partial deformation or removal of the layer; thereby information is recorded in the media.

As the coloring substance of the colored layer, there are used various dyes, pigments, inorganic substances having a color, etc. The colored layer is formed on the substrate by a method such as vacuum deposition or the like. The recording layer is formed on the colored layer by coating on the colored layer a thermoplastic resin (e.g. a polystyrene), a solution of a low-melting organic compound (e.g. n-hexatriacontane or zinc stearate), or the like. As the colored recording layer, there are used mixtures of a low-melting polymer or an organic compound as mentioned above and a dye or pigment.

The recording media comprising a recording layer made of a conventional organic material as mentioned above excel in that high density bit recording is easy, but simultaneously they have the following drawbacks. That is, the colored layer and the recording layer must be formed so as to be very thin and yet to have a uniform surface, which requires in their preparation the adoption of a costly thin film formation method such as a vacuum deposition method; this makes difficult the formation of a recording layer of large area although the formation of a layer of small area is relatively easy and, even if the recording layer of large area is formed, the layer has no uniform thickness; accordingly, the recording layer lacks reliability in performances of recording, reading-out, etc. In addition, the stability of the recording layer and of the information recorded therein when stored over a long period of time is insufficient.

SUMMARY OF THE INVENTION

The first object of the present invention is to provide an optical recording medium having a large recording area and excellent storage stability. The second object of the present invention is to provide an optical recording medium having a uniform film thickness over the entire recording surface and high reliability in recording and reading-out. The third object of the present invention is to provide an optical recording medium enabling high density and high sensitivity recording. The fourth object of the present invention is to provide a method for producing an optical recording medium as mentioned above continuously and efficiently. The fifth object of the present invention is to provide an optical recording medium excellent in storage stability and reliability.

After extensive studies, the inventors have found that a polymer film prepared by known electrolytic polymerization process can be formed uniformly as a recording layer of an optical recording medium on an electroconductive substrate, and further that the film has excellent properties for optical recording, reading out, and storage stability of information, and thus completed the present invention.

The present invention resides in an optical recording medium comprising a substrate and a colored film formed by electrolytic polymerization on said substrate.

The present invention also resides in a method for recording on an optical recording medium comprising a substrate and a colored film formed by electrolytic polymerization on said substrate, the method being characterized by applying light to the recording medium to cause discoloration of the colored film or to form pits in the recording medium.

The present invention also resides in an optical recording medium comprising a non-electroconductive substrate layer, a light-transmittable surface layer and a colored film formed by electrolytic polymerization and interposed between the substrate layer and the surface layer.

The present invention also resides in a method for recording on an optical recording medium comprising a non-electroconductive substrate layer, a light-transmissive surface layer and a colored film formed by electrolytic polymerization interposed between the substrate layer and the surface layer, the method being characterized by applying a light to the recording medium to cause discoloration of the polymer film or to form pits in the recording medium.

DETAILED DESCRIPTION OF THE PREFERRED EMBODIMENTS

Figure 1:
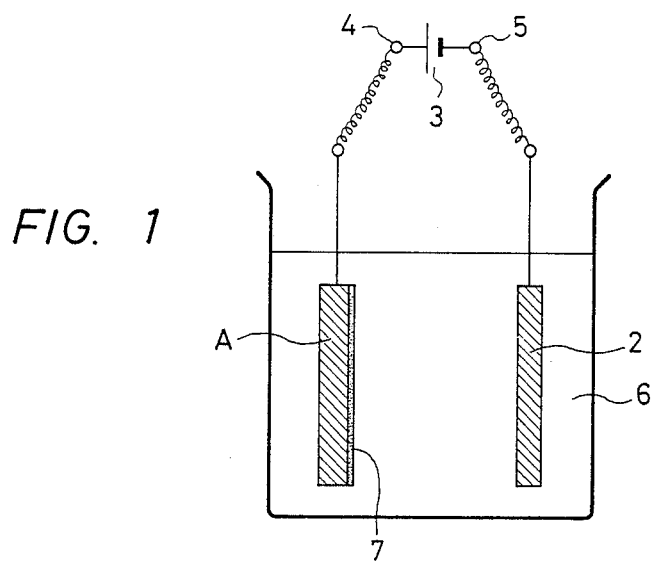
FIG. 1 diagrammatically shows a method for forming an polymer film 7 by electrolytic polymerization on an electroconductive substrate A.

The polymer film which is a main characteristic of the present invention is a thin film obtained by electrolytic polymerization of a monomer on a surface of an electroconductive substrate of desired area. (The film is occasionally referred to as "electrolytically polymerized film".) The method itself for such electrolytic polymerization is known through literature, for example, "Applied Physics, Vol. 52 No. 11 (1983), pages 971 to 974".

The electrolytically polymerized film is obtained by polymerizing a monomer such as thiophene, pyrrole or the like in accordance with the known method. Since this film has excellent electroconductivity, various researches have been conducted for utilizing its electroconductivity in various application fields. However, according to the present invention the electrolytic polymer film, without regard to its electroconductivity, has a very excellent performance as an optical recording layer of a heat mode optical recording medium.

The electrolytic polymer film utilized in the present invention as an optical recording layer can be obtained by electrolytically polymerizing a monomer such as pyrrole, N-methylpyrrole, thiophene, furan, selenophene, tellurophene, indole, azulene, aniline, thienothiophene, pyrrolopyrrole, diacetylene or the like. The film can easily be formed on an electroconductive substrate acting as an anode by dissolving a monomer as mentioned above in an electrolytic solution in a concentration of about $10^{-2}$ to 1 mole/l and then conducting electrolytic polymerization.

Any electroconductive substrate may be employed as the anode in the above-mentioned process. There may be used, for example, metal plates of gold, platinum, silicon, nickel, copper and the like, as well as substrates obtained by vapor-depositing a metal as mentioned above, an electroconductive metal oxide (e.g. thin oxide, indium oxide, indium-tin oxide) or other electroconductive material on a desired substrate such as a glass plate, a resin film or sheet, or the like. The electroconductive substrate used as an anode may be in any shape and of any thickness. In the present invention, on such an electroconductive substrate, there can be formed a high performance optical recording layer having a uniform thickness over the entire surface of the substrate and also having a sufficiently large surface area compared with those of conventional optical recording media. This is the main characteristic of the present invention.

The cathode used in the electrolytic polymerization as an counter electrode of the anode may be made of any materials such as gold, platinum, nickel and the like and has no restriction in its shape.

As the electrolytic solution, there can be used any known electrolytic solutions such as water, acetonitrile, ethanol, dimethylformamide, dioxane, dichloroethane, tetrahydrofuran and the like. These electrolytic solutions can contain, as necessary, any electrolytes such as KCl, NaBr, KI, LiClO$_4$, LiBF$_4$, tetra-n-butylammonium perchlorate, tetra-n-butylammonium perfluoroborate, tetramethylammonium chloride, Na$_2$SO$_4$ and the like. The concentration of these electrolytes is preferably in the range of from about 0.1 to 1 mole/l.

The conditions of electrolytic polymerization differ depending on the monomer used, the kinds and shapes of electrodes used, the kinds and concentrations of electrolytic solution and electrolyte used, the required size of recording surface of optical recording medium, etc. However, in general, a DC voltage of 1 to 10 V is applied for several seconds to several minutes, whereby an electrolytic polymer film of about 0.1 to 10 $\mu$m is formed on the anode. This electrolytic polymer film generally has a deep color of brown to black depending upon the kind of electrolyte used. When the coloring is insufficient, the hue or color density can be changed or increased by adding to the electrolytic solution an appropriate amount of an color substance such as a dye having an anionic group (e.g. acid dye or direct dye). Such coloring by a dye may naturally be conducted after the formation of an electrolytic polymer film.

The most important finding in the present invention is that the electrically polymerized film has a highly excellent performance as an optical recording layer of optical recording medium. That is, it was found in the present invention that the electrolytically polymerized film formed on an electroconductive substrate is highly responsive to various recording light such as various laser beams, particularly to a semiconductor laser beam and absorbs irradiated recording light to convert efficiently to heat which causes only the irradiated spots to be decolorized, modified or decomposed to be removed and thereby various information can be recorded in the film with a high efficiency, at a high density and at a high reliability.

The optical recording medium of the present invention can be obtained simply by formation of an electrically polymerized film as mentioned above on an electroconductive substrate. Therefore, in the present invention, an electroconductive substrate having a large area can be used and, moreover, on the entire surface of this substrate there can uniformly be formed a thin film having an excellent optical recording ability. In this way, the main object of the present invention can be achieved. Further, the optical recording medium of the present invention need not employ a vapor deposition method nor a spinner coating method as used in conventional techniques. Therefore, an optical recording medium having a desired shape and a desired recording layer thickness can be provided very easily at extremely low cost.

The electrolytically polymerized film which has been formed on an electroconductive substrate can be transferred onto another non-electroconductive substrate layer. A light-transmissive surface layer may further be formed on the electrolytically polymerized film.

The surface layer can be made of any material regardless of its light-transmissivity as long as it has some strength and durability. The material preferably is, for example, a colored or non-colored inorganic material (e.g. a glass plate) or a colored or non-colored resin film or sheet (e.g. those of a polyester, a polyamide, a polyolefin, a polystyrene, a polyvinyl chloride and a polyvinylidene chloride). The substrate layer has no restriction in its thickness and shape. However, the thickness is generally preferred to be about 0.05 to 0.5 mm.

The surface layer is required to be substantially light-transmissive and must be able to transmit a recording light efficiently and to protect the recording layer from external attacks by moisture, oxygen and physical actions. Such a surface can be made of the same material as used in the substrate layer as long as the material is light-transmissive. The surface layer preferably has a thickness of about 0.01 to 50 $\mu$m. The shape of the surface layer depends on the desired shape of optical recording medium.

The optical recording medium of the present invention comprising a substrate layer, an optical recording layer and a surface layer can be formed in accordance with any method. Preferably it can be formed as follows. On the surface of an optical recording layer formed on an electroconductive substrate, there is formed a uniform and thin adhesive layer. A substrate layer or a surface layer is allowed to adhere onto the adhesive layer. From the resulting laminate is peeled off the electroconductive substrate. A surface layer or a substrate layer is formed on the surface of the exposed recording layer.

In the above, an adhesive layer may be formed either on a substrate layer or on a surface layer to yield the same effect. When a substrate layer or a surface layer is formed, for example, by means of coating of a polymer solution, formation of an adhesive layer is not necessary. When the three layers are laminated by hot pressing or hot lamination, formation of an adhesive layer may be unnecessary.

The optical recording medium of the present invention can record information using various recording lights. As the recording light, there can be used any light that can be absorbed by the optical recording layer of the optical recording medium of the present invention and that has energy to generate heat to cause the change of the hue of the recording layer, the modification of the recording layer or the decomposition of the recording layer. For example, infrared rays, a visible light, ultraviolet rays and electron beams can be used. Preferable recording lights are laser beams. The most preferable is a semiconductor laser beam.

The same lights as above can be used for reading out (regenerating) the information recorded in the optical recording medium of the present invention. However, the light used for the regeneration of the information recorded is required to be weak such that it does not degenerate the recording layer of the recording medium.

Figure 2:
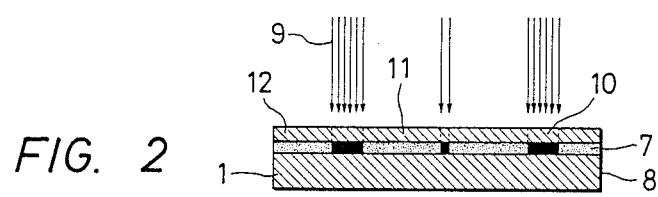
FIGS. 2 to 4 diagrammatically show structures of optical recording media 8 of the present invention as well as methods for conducting recording thereon.
Figure 3:
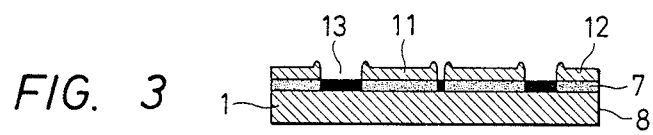
Figure 4:
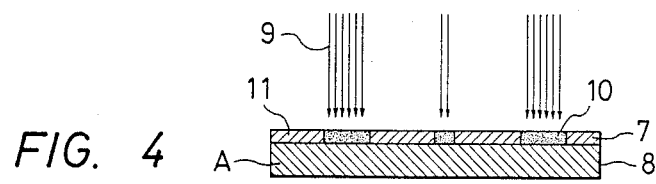

The present invention will be described in more detail by referring to the drawings illustrating the embodiment of the present invention. FIG. 1 diagrammatically shows a method for forming an electrolytically polymerized film 7 on an electroconductive substrate A. FIGS. 2 to 4 diagrammatically show structures of optical recording media 8 and methods for conducting recording on these media.

As shown in FIG. 1, an electroconductive substrate A and a counter electrode 2 are connected to an anode 4 and a cathode 5 of a DC source 3, respectively, and are immersed in an electrolytic solution 6. Then, an electricity is allowed to flow at a voltage of about 1 to 10 V for several seconds to several minutes, whereby a polymer 7 of a monomer used is deposited on the electroconductive substrate A serving as an anode. The electrolytic polymer film 7 thus formed and the electroconductive substrate A are washed together with an appropriate solvent and dried. Thereafter, the electrolytically polymerized film 7 is transferred onto a substrate layer 1 or onto a surface layer 12 by the above mentioned method, whereby a three layer structure can be formed. In such a simple procedure, an optical recording medium 8 can be obtained.

When a substrate layer or a surface layer is formed by electrophoresis, the layer may be formed subsequently to the formation of an optical recording layer.

FIGS. 2 and 3 diagrammatically show methods for conducting recording on an optical recording medium 8 of the present invention as formed as above. As shown in FIG. 2, when a recording light 9 is irradiated to an optical recording medium 8 of the present invention in accordance with a given information, an electrolytically polymerized film 7 (an optical recording layer) on a substrate layer 1 undergoes discoloration or degeneration only at the irradiated portions 10 and these portions becomes clearly different from those of the non-irradiated portions 11 such as in light reflection. Therefore, by applying, to the recording layer partially discolored or degenerated, a weak light which does not degenerate the recording layer, the information recorded in the recording layer can be read out exactly by absorption and reflection of the light As shown in FIG. 3 diagrammatically, if a strong light such as a laser beam is used as the recording light 9, an electrolytic polymer film 7 generates heat at irradiated portions 10, whereby a surface layer 12 on the electrolytically polymerized film 7 is melted at the irradiated portions 10 and hollowed pits 13 are formed corresponding to the recording light applied or even the colored electrolytically polymerized film 7 is decomposed and removed at the irradiated portions 10 (not shown in FIG. 3). In this case, reading-out of information recorded can be made not only by a reflected light but also by a transmitted light.

In FIG. 4, there is used, as the substrate of an optical recording medium, an anode of electrolytic polymerization.

As described above, the present invention can provide very easily and accordingly inexpensively an optical recording medium which can conduct high density recording of information and their reading out efficiently and exactly and which further can have any desired shape and a large recording area, both of these points having been unachievable in conventional techniques.

The present invention will be described specifically by way of Examples.

EXAMPLE 1

In a distilled water containing 0.05 M of pyrrole and 0.1 M of sodium p-toluenesulfonate were immersed an ITO substrate as an anode having a dimension of 2 mm (thickness)×10 cm×10 cm and resistance of about 20 $\Omega$ and a nickel plate as a cathode. Then, a DC voltage of 3 V was applied between the two electrodes to allow a DC current to flow for 1 minute. On the whole surface of the ITO substrate (anode) was formed a greenish brown polypyrrole film having a uniform thickness of about 1 $\mu$m. This film was taken out together with the substrate, and they were washed with water and acetone in this order and then dried with heating. Thereafter, a polyester film (Mylar film) of about 50 $\mu$m in thickness coated thinly with an adhesive was pressed to the polypyrrole film by pressing to adhere. Upon peeling of the Mylar film, the polypyrrole film was perfectly transferred onto the Mylar film. This laminate thus formed was further contact-bonded to a glass plate of about 2 mm in thickness coated thinly with an adhesive so that the polypyrrole film side faced the glass plate, whereby they were made into an integral body and an optical recording medium of the present invention was obtained An argon laser beam (wavelength: 514.5 nm, power: 10 mW) as a recording light was irradiated to the optical recording medium obtained above for about 1 microsecond, to conduct bit recording on the recording medium. As shown in FIG. 2, the optical recording layer 7 caused discoloration due to thermal change, at the irradiated portions 10. The same argon laser beam was applied to another optical recording medium of the present invention prepared in the same manner, for about 10 microsecond. There were formed pits 13 having the same diameter as the spot diameter (about 30 $\mu$m) of the laser used, and a discolored optical recording layer appeared The recorded information could be regenerated exactly by applying to the media a light from other light source and detecting its reflected or transmitted light using a sensor. Further, these optical recording media can store recorded information very stably and enable exact reading-out of these information even after the lapse of a long period.

A semiconductor laser beam or a xenon flash light could also be used as a recording light.

EXAMPLES 2 to 9

In accordance with the prescription shown below, optical recording media of the present invention were prepared in the same manner as in Example 1. For these optical recording media, recording and reading-out were conducted in the same manner as in Example 1. The results were excellent as in Example 1.

EXAMPLE 2

| [Formation of colored, electrolytically polymerized film] | |
| --- | --- |
| Monomer and its concentration | Pyrrole 1.0 M |
| Electrolyte and its concentration | Sodium sulfate 1.0 M |
| Solvent | Water |
| Applied voltage | 3 V |
| Polymerization time | 30 seconds |
| [Substrate layer and surface layer] | |
| Substrate layer | Mylar (0.1 mm) |
| Surface layer | Polystyrene (10 μm) |

EXAMPLE 3

| [Formation of colored, electrolytically polymerized film] | |
| --- | --- |
| Monomer and its concentration | Pyrrole 1.0 M |
| Electrolyte and its concentration | Sodium salt of copper-phthalo-cyanine-tetra-sulfonic acid 0.5 M |
| Solvent | Water |
| Applied voltage | 3.5 V |
| Polymerization time | 60 seconds |
| [Substrate layer and surface layer] | |
| Substrate layer | Mylar (0.1 mm) |
| Surface layer | Polyvinyl chloride (2 μm) |

EXAMPLE 4

| [Formation of colored, electrolytically polymerized film] | |
| --- | --- |
| Monomer and its concentration | Pyrrole 1.0 M |
| Electrolyte and its concentration | Tetra-n-butyl ammonium tetrafluoroborate 1.0 M |
| Solvent | Acetonitrile |
| Applied voltage | 3 V |
| Polymerization time | 60 seconds |
| [Substrate layer and surface layer] | |
| Substrate layer | Glass (2 mm) |
| Surface layer | Mylar (50 μm) |

EXAMPLE 5

| [Formation of colored, electrolytically polymerized film] | |
| --- | --- |
| Monomer and its concentration | Pyrrole 1.0 M |
| Electrolyte and its concentration | Tetra-n-butyl-ammonium perchlorate 1.0 M |
| Solvent | Acetonitrile |
| Applied voltage | 3 V |
| Polymerization time | 60 seconds |
| [Substrate layer and surface layer] | |
| Substrate layer | Mylar (0.2 mm) |
| Surface layer | Polystyrene (1 μm) |

EXAMPLE 6

| [Formation of colored, electrolytically polymerized film] | |
| --- | --- |
| Monomer and its concentration | Indole 1.0 M |
| Electrolyte and its concentration | Tetra-n-butyl-ammonium perchlorate 1.0 M |
| Solvent | Acetonitrile |
| Applied voltage | 3.5 V |
| Polymerization time | 60 seconds |
| [Substrate layer and surface layer] | |
| Substrate layer | Mylar (0.2 mm) |
| Surface layer | Polyvinyl chloride (3 μm) |

EXAMPLE 7

| [Formation of colored, electrolytically polymerized film] | |
| --- | --- |
| Monomer and its concentration | Pyrrolopyrrole 1.0 M |
| Electrolyte and its concentration | Tetra-n-butyl-ammonium perchlorate 1.0 M |
| Solvent | Acetonitrile |
| Applied voltage | 3 V |
| Polymerization time | 50 seconds |
| [Substrate layer and surface layer] | |
| Substrate layer | Glass (2 mm) |
| Surface layer | Mylar (50 μm) |

EXAMPLE 8

| [Formation of colored, electrolytically polymerized film] | |
| --- | --- |
| Monomer and its concentration | Pyrrolopyrrole 1.0 M |
| Electrolyte and its concentration | Sodium p-toluenesulfonate 1.0 M |
| Solvent | Water |
| Applied voltage | 3 V |
| Polymerization time | 40 seconds |
| [Substrate layer and surface layer] | |
| Substrate layer | Mylar (0.2 mm) |
| Surface layer | Polystyrene (1 μm) |

EXAMPLE 9

| [Formation of colored, electrolytically polymerized film] | |
|---|---|
| Monomer and its concentration | Aniline (1 M) |
| Electrolyte and its concentration | Sodium sulfate (0.5 M) |
| Solvent | Water (pH = 1.0) |
| Applied voltage | 3.5 V |
| Polymerization time | 60 seconds |
| [Substrate layer and surface layer] | |
| Substrate layer | Mylar (0.2 mm) |
| Surface layer | Mylar (50 μm) |

EXAMPLE 10

In an acetonitrile solvent containing 0.5 M of thiophene and 0.5 M of tetra-n-butylammonium perchlorate were immersed, as an anode, a glass plate having a dimension of 2 mm (thickness) ×15 cm ×15 cm on which indium-tin oxide (ITO) having a resistance of about 20 Ω was vapor-deposited and a nickel plate, as a cathode. Then, a DC voltage of 10 V was applied between the two electrodes to allow a DC current to flow for 2 minutes. On the whole surface of the ITO plate (anode) was formed a polythiophene film having a uniform thickness of about 1 μm. This film was taken out together with the substrate, and they were washed with water and acetone in this order and then dried with heating, whereby an optical recording medium of the present invention was obtained.

An argon laser beam (wavelength: 514.5 nm, power: 10 mW) as a recording light was applied to the optical recording medium obtained above for about 10 microseconds, to conduct bit recording on the recording medium. The irradiated portions of the electrolytically polymerized film caused thermal change and resultantly faded in color and increased in light reflectivity compared with the non-irradiated portions. The same argon laser beam was applied to another optical recording medium of the present invention prepared in the same manner, for about 1 millisecond. The irradiated portions disappeared completely and there were formed pits having the same diameter as the spot diameter (about 30 μm) of the laser used, and the surface of the substrate became exposed. The information recorded on these optical recording media could be regenerated exactly by applying to the media a light from other light source and detecting its reflected or transmitted light using a sensor. Further, these optical recording media can store recorded information very stably and enable exact reading-out of these information even after the lapse of a long period.

A semiconductor laser beam or a xenon flash light could also be used as a recording light.

We claim:

1. A method for recording on an optical recording medium comprising a non-electroconductive substrate layer, a light-transmissive surface layer and a colored film formed by electrolytic polymerization and interposed between the substrate layer and the surface layer, the method comprising the step of applying light to the recording medium in such a manner that the colored film of the recording medium generates heat in response to the applied light, to melt the surface layer to form pits therein, wherein the colored film is selected from a polymer film formed from a monomer unit selected from the group consisting of pyrrole, N-methylpyrrole, thiophene, furan, selenophene, tellurophene , indole , azulene, aniline, thienothiophene, pyrrolopyrrole and diacetylene.

2. A method according to claim 1, wherein the light is a laser beam.

3. A method for recording on an optical recording medium comprising a non-electroconductive substrate, a light-transmissive surface layer and a colored film formed by electrolytic polymerization and interposed between the substrate and the surface layer, the method comprising the step of applying light to the recording medium in such a manner that the colored film of the recording medium generates heat to melt the surface layer to form pits therein, depending on the amount of light as applied, wherein the colored film is selected from a polymer film formed from a monomer unit selected from the group consisting of pyrrole, N-methylpyrrole, thiophene, furan, selenophene, tellurophene indole, azulene, aniline, thienothiophene, pyrrolopyrrole and diacetylene.

4. The method according to claim 3, wherein the light is a laser beam.

5. A method according to claim 1, wherein the thickness of the surface layer range s from 0.01 to 50 μm.

6. A method according to claim 3, wherein the thickness of the surface layer ranges from 0.01 to 50 μm.

7. A method according to claim 1, wherein the thickness of the colored film ranges from 0.1 to 10 μm.

8. A method according to claim 3, wherein the thickness of the colored film ranges from 0.1 to 10 μm.

* * * * *